United States Patent
Malacara-Carrillo et al.

(10) Patent No.: US 10,950,404 B2
(45) Date of Patent: Mar. 16, 2021

(54) MODULARITY FOR CIRCUIT BREAKERS

(71) Applicant: Siemens Industry, Inc., Alpharetta, GA (US)

(72) Inventors: Hector Manuel Malacara-Carrillo, Alpharetta, GA (US); William McCoy, Stone Mountain, GA (US); Jesus Hernandez, Suwanee, GA (US); Andrew Wynn, Atlanta, GA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 229 days.

(21) Appl. No.: 16/257,282

(22) Filed: Jan. 25, 2019

(65) Prior Publication Data

US 2020/0243292 A1 Jul. 30, 2020

(51) Int. Cl.
*H01H 71/02* (2006.01)
*H01H 71/74* (2006.01)
*H01H 9/30* (2006.01)
*H02H 3/10* (2006.01)
*H01H 83/20* (2006.01)

(52) U.S. Cl.
CPC .......... *H01H 71/0264* (2013.01); *H01H 9/30* (2013.01); *H01H 71/7409* (2013.01); *H01H 83/20* (2013.01); *H02H 3/105* (2013.01); *H01H 2083/201* (2013.01)

(58) Field of Classification Search
CPC .. H01H 71/0264; H01H 71/7409; H01H 9/30; H01H 83/20; H01H 2083/201; H02H 3/105
See application file for complete search history.

(56) References Cited

U.S. PATENT DOCUMENTS 10,249,464 B2 * 4/2019 Hiremath ............... H01H 69/00
2020/0212670 A1 * 7/2020 Butler .................... H01H 9/542

* cited by examiner

*Primary Examiner* — Gary L Laxton

(57) ABSTRACT

A modular residential circuit breaker comprises an assembly including an operation module and a first application module. The operation module includes an operation mechanism, a trip system, and an arc suppression system except a specific mounting and a current application. The first application module is configured to mate with the operation module to form a complete circuit breaker and define a replacement breaker frame for having an external modularity for the modular residential circuit breaker.

19 Claims, 14 Drawing Sheets

MODULARITY FOR CIRCUIT BREAKERS

BACKGROUND

1. Field

Aspects of the present invention generally relate to modularity for circuit breakers.

2. Description of the Related Art

Continuous development of new technologies in energy management and distribution has led to continuous changes on several electrical distribution standards and codes. In response to all of these codes and standards changes, energy management companies start working to adapt current products to the applications that are affected by the code change. In several cases a company needs to totally develop new products to fulfill the needs of new codes. When this happens, new product development could take as low as 3 years and as long as 5.5 years in multi-million dollar cost project. This major trend provides an opportunity to incorporate new technologies and/or designs into residential circuit breakers. Many opportunities for modularity designs exist, including, but not limited to, the ability to provide customers and markets a faster response for new products when codes change.

One of the biggest problems is that a modular design typically offers several operation modules for different combinations and/or applications. Another evident issue is that such designs are typically for three phase applications and higher voltage applications (>480V AC).

Therefore, there is a need of modularity for circuit breakers and an improved modular design.

SUMMARY

Briefly described, aspects of the present invention relate to modularity for circuit breakers. Modularity provides an opportunity to incorporate new technologies and/or designs into residential and commercial circuit breakers. Modularity provides an ability to fulfill several breaker applications by using a single operation module (OpMod) with several application modules (ApMods) to more efficiently fulfill customer's demands. Modularity provides an ability to provide to customers and markets a faster response for new products when codes change. An additional problem modularity will solve is the excess of inventory of several different product designs in manufacturing factories. By having a variety of products that use a single operation module (OpMod) one will facilitate the production line logistics and inventory management.

In accordance with one illustrative embodiment of the present invention, a modular residential circuit breaker is described. It comprises an operation module including an operation mechanism, a trip system, and an arc suppression system except a specific mounting and a current application. It further comprises a first plug-in type application module configured to mate with the operation module to form a complete circuit breaker and define a replacement breaker frame for having an external modularity for the modular residential circuit breaker. The first plug-in type application module differs from other plug-in type application modules in that the first plug-in type application module includes a first mount type and a first current application defining a first way the modular residential circuit breaker is attached to a load current and a line current such that a mounting footprint and a bus arrangement matches a first existing singular breaker. The first plug-in type application module differs from a second plug-in type application module configured to be assembled to the operation module in place of the first plug-in type application module in that each plug-in type application module of the first plug-in type application module and the second plug-in type application module provides a specific application.

In accordance with another illustrative embodiment of the present invention, a modular residential circuit breaker is provided. It comprises an operation module including an operation mechanism, a trip system, and an arc suppression system except a specific mounting and a current application. It further comprises a first application module configured to mate with the operation module to form a complete circuit breaker and define a replacement breaker frame for having an external modularity for the modular residential circuit breaker.

DETAILED DESCRIPTION

To facilitate an understanding of embodiments, principles, and features of the present invention, they are explained hereinafter with reference to implementation in illustrative embodiments. In particular, they are described in the context of an operation module (OpMod) attached to a plug-in type application module (ApMod). The two assembled modules form a modular circuit breaker designed as a direct replacement for an existing singular circuit breaker. In this way, a family of possible frames can be created by assembling an operation module and many different application modules to form modular residential circuit breakers. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Figure 1:
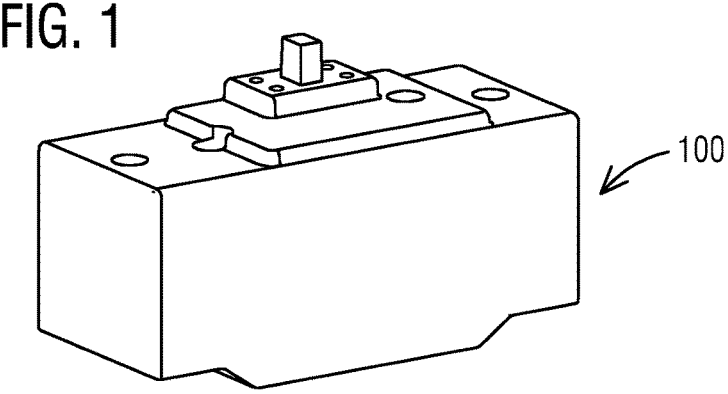
FIG. 1 illustrates a representation of a perspective view of an operation module (OpMod) in accordance with an exemplary embodiment of the present invention.

Consistent with one embodiment of the present invention, FIG. 1 represents a representation of a perspective view of an operation module (OpMod) 100 in accordance with an exemplary embodiment of the present invention. The operation module (OpMod) 100 is part of an assembly of a modular residential circuit breaker. The operation module (OpMod) 100 includes an operation mechanism, a trip system, and an arc suppression system except a specific mounting and a current application.

The operation module (OpMod) 100 provides an ability to fulfill several breaker applications by using a single operation module (OpMod) with several application modules (ApMods) (see FIG. 2) to more efficiently fulfill customer's demands. The operation module (OpMod) 100 provides an ability to provide to customers and markets a faster response for new products when codes change. An additional problem modularity will solve is the excess of inventory of several different product designs in manufacturing factories. By having a variety of products that use a single operation module (OpMod) 100 one will facilitate the production line logistics and inventory management. One application of this modularity is focused on a single and/or a multi-phase circuit with a voltage rating of 120/240 VAC and a continuous current rating from 100-250 A. The target customers are within the residential segment of the NAFTA market, which includes single-family homes and multi-dwelling units. This modularity will allow one to react faster to the markets demands by optimizing the current design by stepping into a modular design. An additional benefit to this modularity includes the potential implementation of LEAN manufacture in the production line which will help to manage their inventory levels and consolidate production lines.

Figure 2:
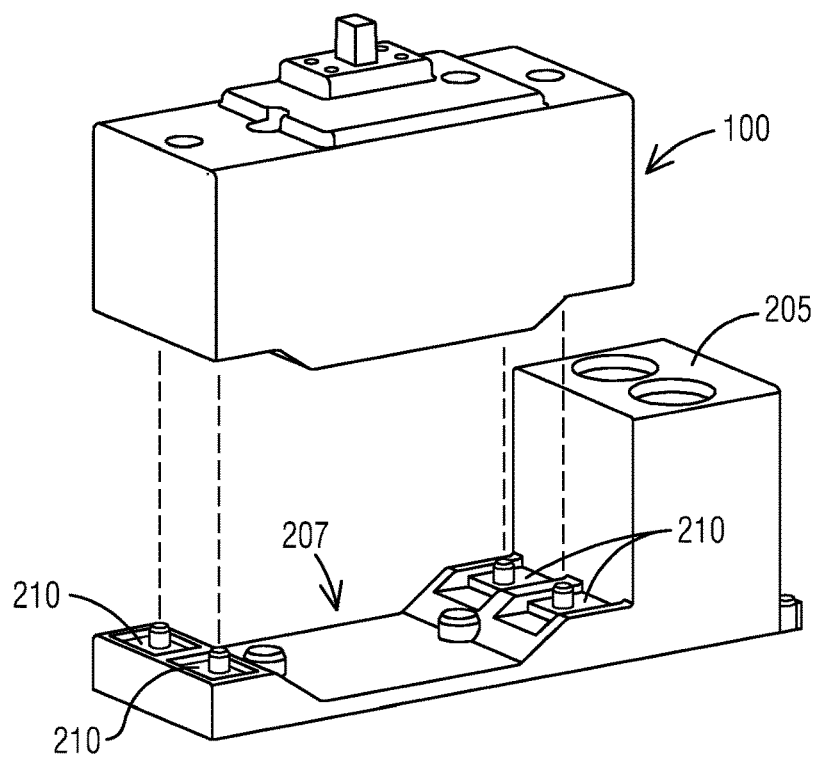
FIG. 2 illustrates a representation of a perspective view of the operation module (OpMod) of FIG. 1 is being attached to an application module (ApMod), a plug-in type with lugs out in accordance with an exemplary embodiment of the present invention.

Referring to FIG. 2, it illustrates a representation of a perspective view of the operation module (OpMod) 100 of FIG. 1 is being attached to a first application module (ApMod) 205 being a plug-in type with lugs out in accordance with an exemplary embodiment of the present invention. The first plug-in type application module 205 is configured to mate with the operation module (OpMod) 100 of FIG. 1 to form a complete circuit breaker and define a replacement breaker frame for having an external modularity for the residential circuit breaker (see FIG. 3). The first plug-in type application module (ApMod) 205 differs from other plug-in type application modules in that the first plug-in type application module (ApMod) 205 includes a first mount type 207 and a first current application 210 defining a first way the modular residential circuit breaker is attached to a load current and a line current such that a mounting footprint and a bus arrangement matches a first existing singular breaker.

The first plug-in type application module (ApMod) 205 differs from a second plug-in type application module (See FIG. 24) configured to be assembled to the operation module (OpMod) 100 in place of the first plug-in type application module (ApMod) 205 in that each plug-in type application module of the first plug-in type application module (ApMod) 205 and the second plug-in type application module provides a specific application. The operation module (OpMod) 100 is a single operation module that is configured to be used with different plug-in type application modules for enabling different applications. All the different plug-in type application modules share the same single operation module such that an application can be added as needed. All the different plug-in type application modules differ in a current location and a mounting location. A family of possible breaker frames is created by assembling the single operation module (OpMod) 100 and a plug-in type application module (ApMod) 205 at a time with the different plug-in type application modules to form circuit breakers that represent an existing circuit breaker family.

Figure 3:
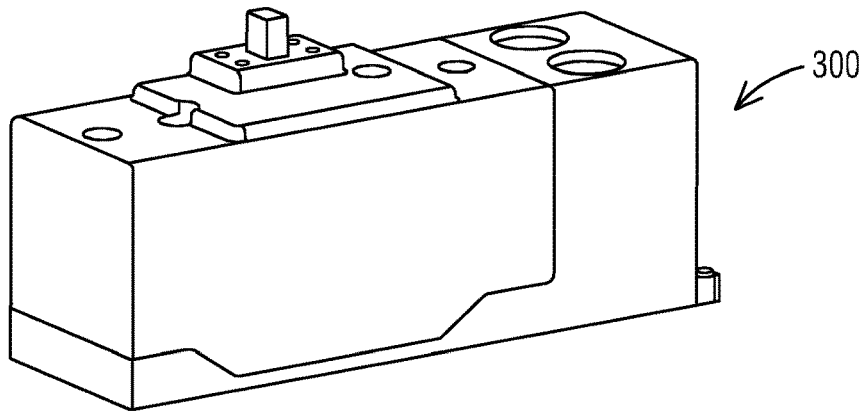
FIG. 3 illustrates a representation of a perspective view of the assembled modules to form a modular circuit breaker designed as a direct replacement for an existing singular circuit breaker in accordance with an exemplary embodiment of the present invention.

Turning now to FIG. 3, it illustrates a representation of a perspective view of the two assembled modules (100, 205) to form a modular circuit breaker such as a modular residential circuit breaker 300 designed as a direct replacement for an existing singular circuit breaker in accordance with an exemplary embodiment of the present invention. The modular residential circuit breaker 300 may be a 2-pole main miniature circuit breaker.

A production line layout for the modular residential circuit breaker 300 can reduce two production lines into one production line by simplifying a breaker assembly process and using a modular circuit breaker technique which will have a single operation module (OpMod) 100 that will be assembled with multiple different plug-in type application modules (ApMods) 205. This modular circuit breaker technique for production enables creation of a new type of mounting for the modular residential circuit breaker 300 by creating a new plug-in type application module (ApMod) without affecting how the modular residential circuit breaker 300 works in the operation module (OpMod). This modular circuit breaker technique for production enables making operational design changes to a circuit breaker family by changing just the operation module (OpMod) 100 instead of several individual breaker frames.

Figure 4A:
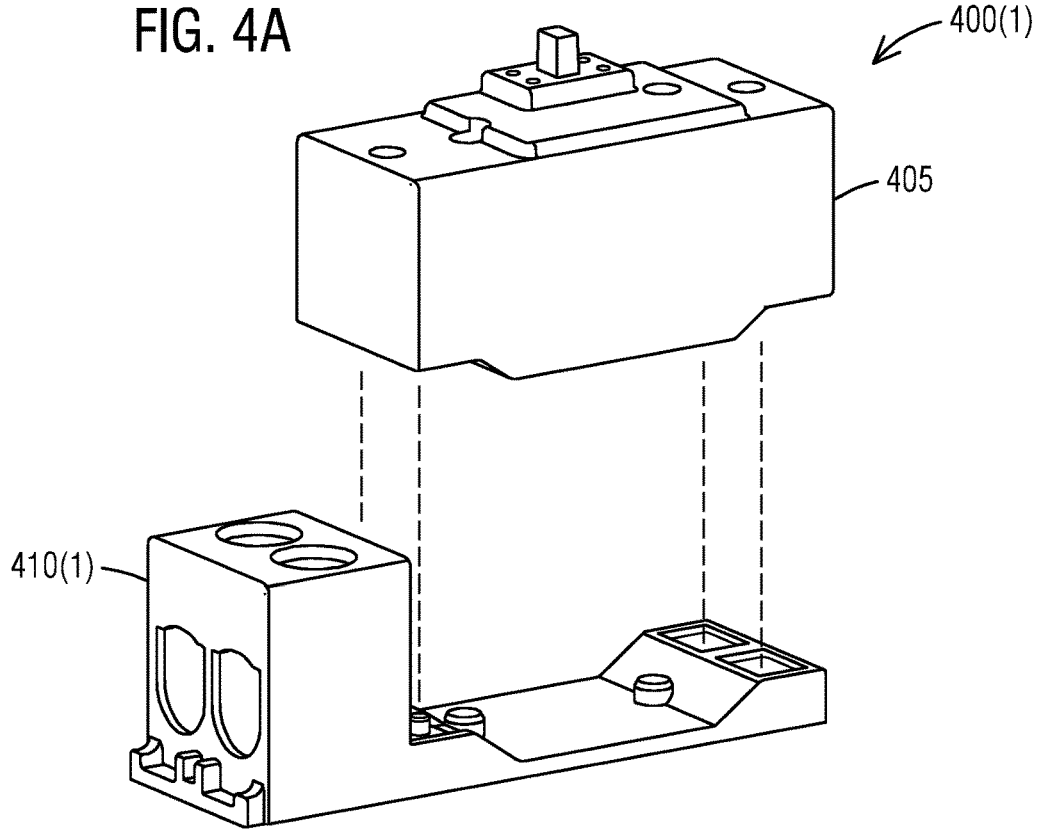
FIG. 4A-4D illustrate a representation of perspective views of a family of possible frames that can be created by assembling an operation module and many different application modules to form circuit breakers in accordance with an exemplary embodiment of the present invention.
Figure 4B:
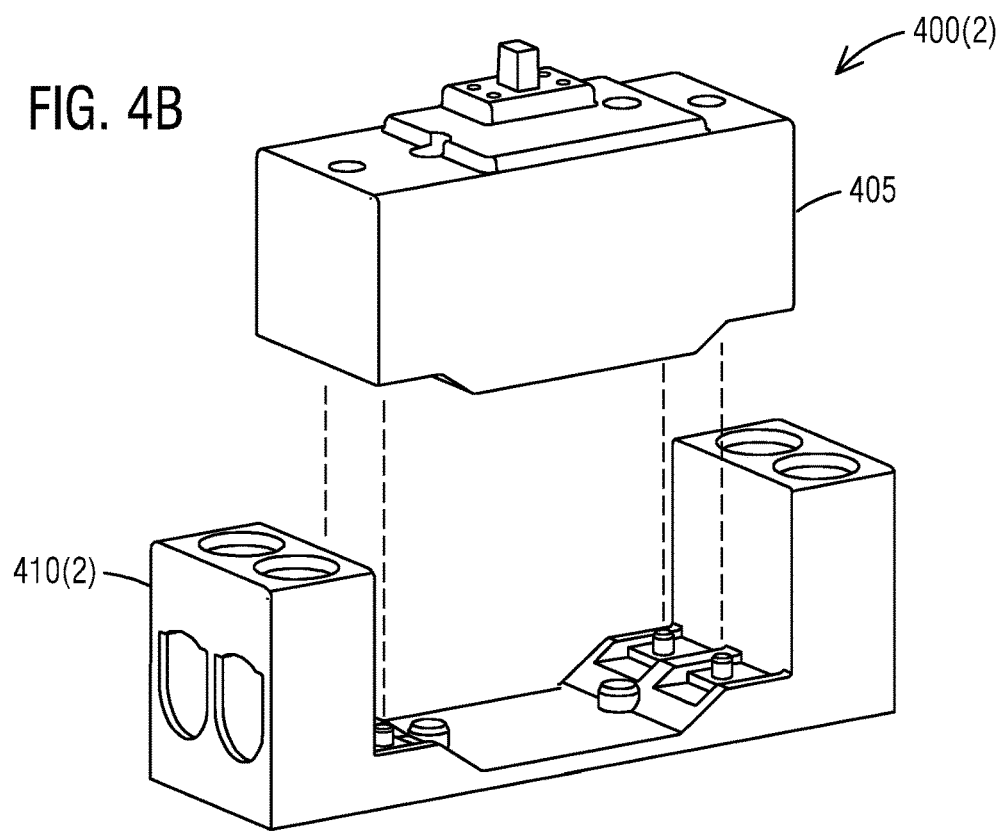
Figure 4C:
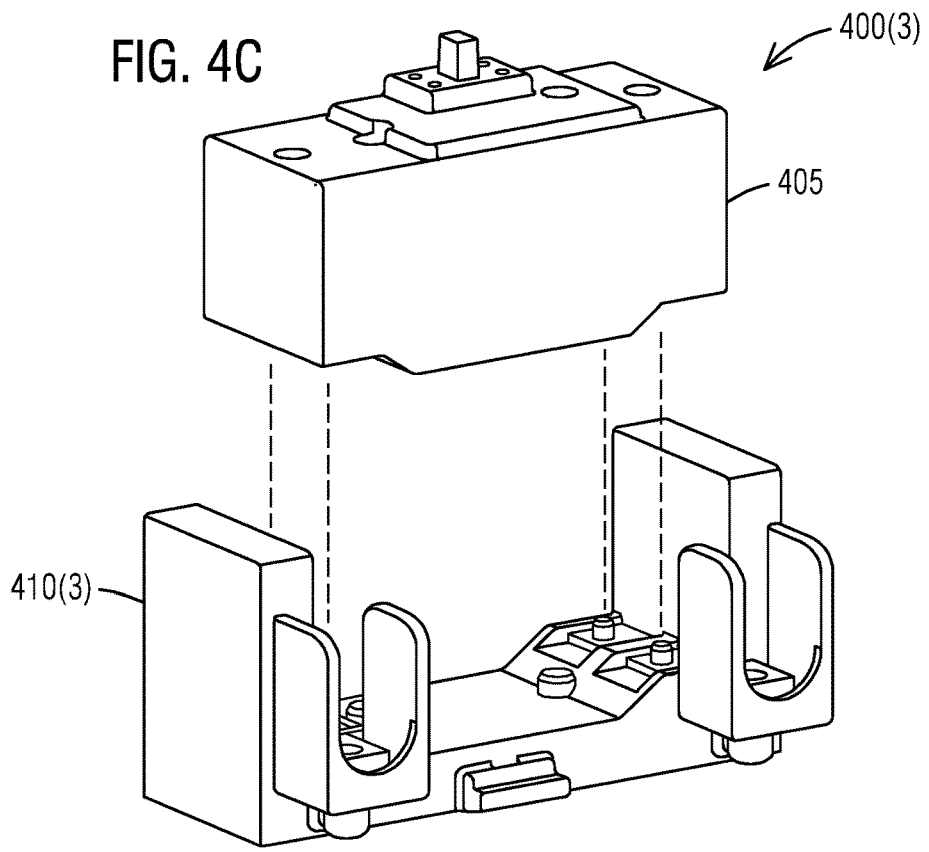
Figure 4D:
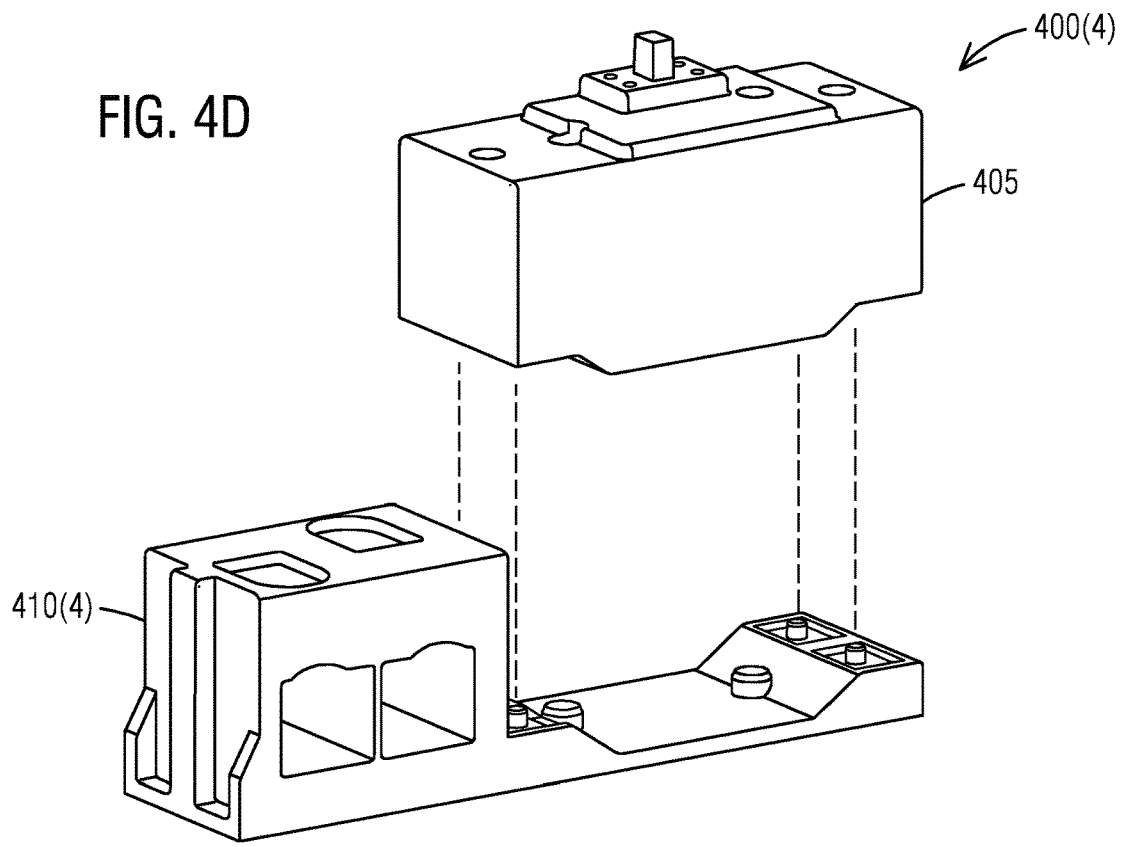

FIG. 4A-4D illustrate a representation of perspective views of a family of breaker frames 400(1-4) that can be created by assembling an operation module (OpMod) 405 and many different application modules (ApMods) 410(1-4) to form modular circuit breakers in accordance with an exemplary embodiment of the present invention. In FIG. 4A, a first breaker frame 400(1) includes the operation module (OpMod) 405 and a first application module (ApMod) 410(1). In FIG. 4B, a second breaker frame 400(2) includes the operation module (OpMod) 405 and a second application module (ApMod) 410(2). In FIG. 4C, a third breaker frame 400(3) includes the operation module (OpMod) 405 and a third application module (ApMod) 410(3). In FIG. 4D, a fourth breaker frame 400(4) includes the operation module (OpMod) 405 and a fourth application module (ApMod) 410(4).

Figure 5:
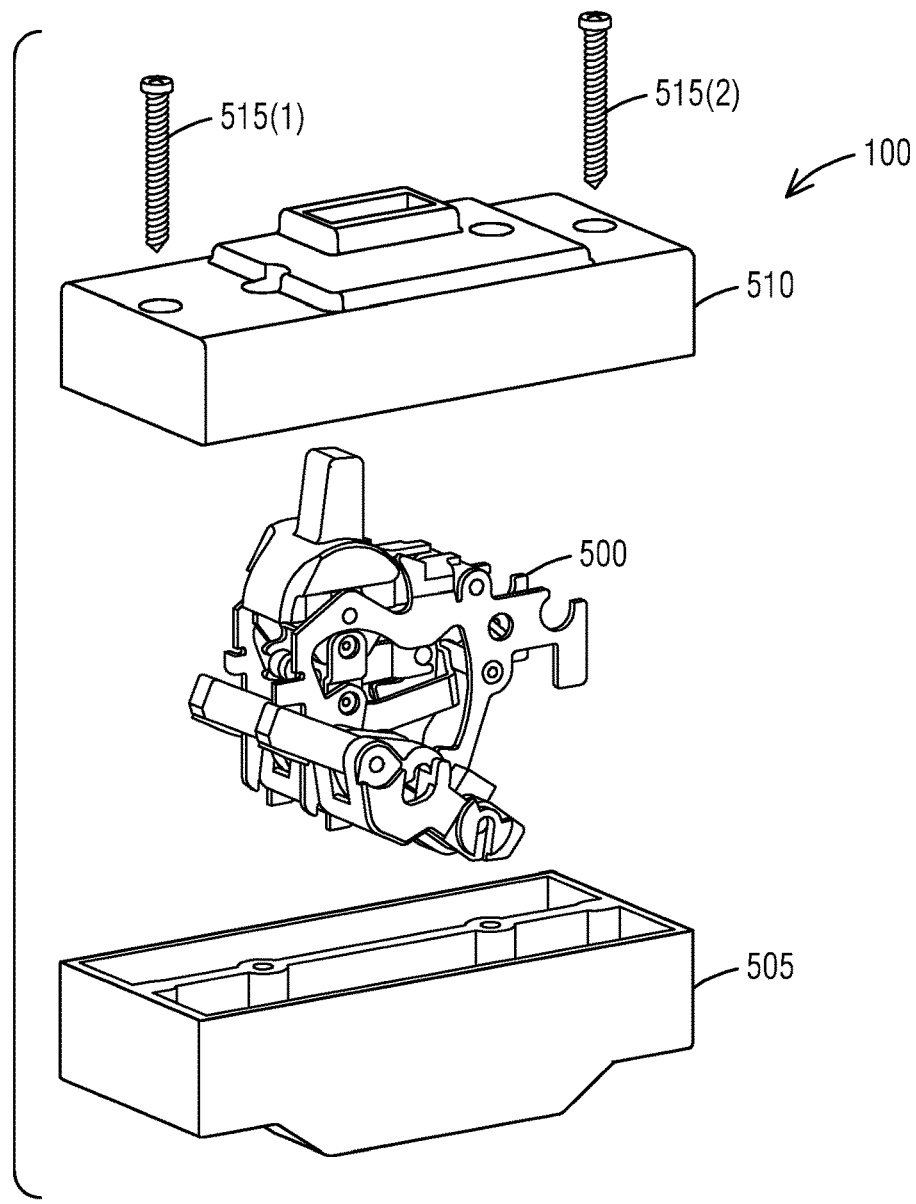
FIG. 5 illustrates a representation of an exploded view of an operation module (OpMod) in accordance with an exemplary embodiment of the present invention.

As seen in FIG. 5, it illustrates a representation of an exploded view of the operation module (OpMod) 100 in accordance with an exemplary embodiment of the present invention. The operation module (OpMod) 100 comprises breaker subassemblies 500 which include an operation mechanism, a trip system, and an arc suppression system except a specific mounting and a current application. The operation module (OpMod) 100 further comprises a base 505, a cover 510 and two screws 515(1-2) for assembling the cover 510 to the base 505. The base 505 and the cover 510 of the operation module (OpMod) 100 may be made of thermoset material.

Functionally, the operation module (OpMod) 100 resembles a circuit breaker. The difference between standard circuit breakers and the operation module (OpMod) 100 is the configuration of a Line Bus and a Load Bus. Where a standard breaker is bussed to fit a particular application, the operation module (OpMod) 100 is made to join with any number of application modules (ApMod) that perform different customer functions.

Figure 6:
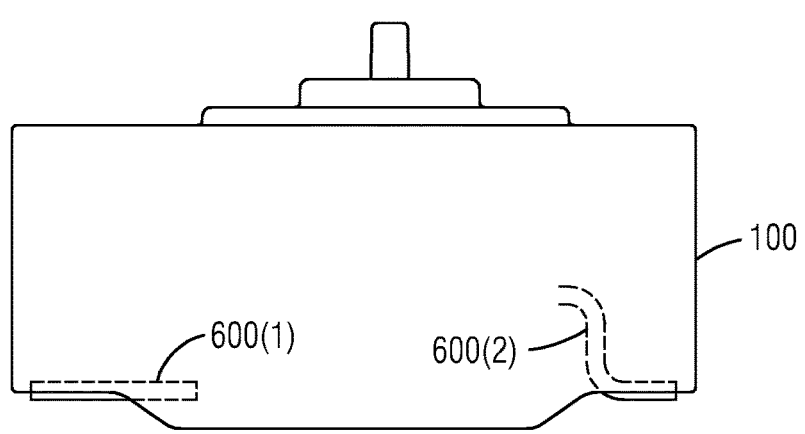
FIG. 6 illustrates a representation of a front view of an operation module (OpMod) in accordance with an exemplary embodiment of the present invention.

As shown in FIG. 6, it illustrates a representation of a front view of the operation module (OpMod) 100 in accordance with an exemplary embodiment of the present invention. The operation module (OpMod) 100 includes a first bus 600(1) and a second bus 600(2) laid out near a bottom region.

Figure 7:
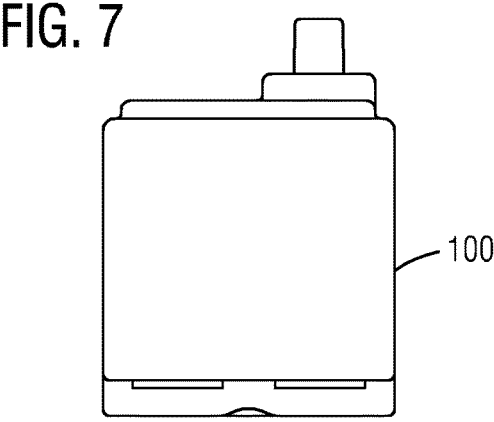
FIG. 7 illustrates a representation of a side view of an operation module (OpMod) in accordance with an exemplary embodiment of the present invention.
Figure 8:
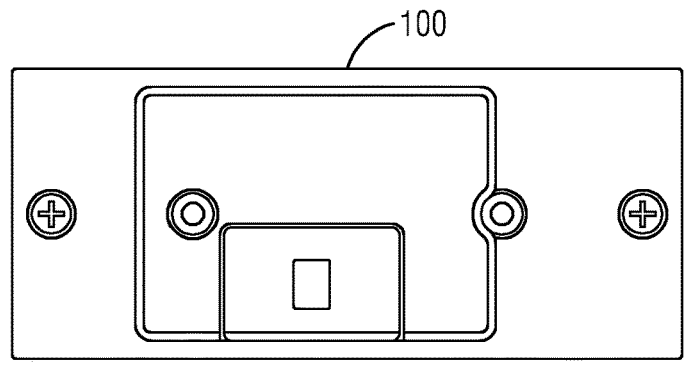
FIG. 8 illustrates a representation of a top view of an operation module (OpMod) in accordance with an exemplary embodiment of the present invention.
Figure 9:
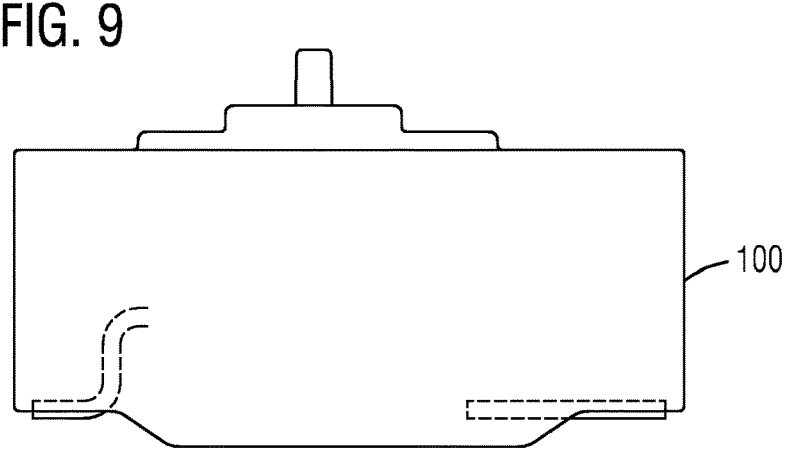
FIG. 9 illustrates a representation of a back view of an operation module (OpMod) in accordance with an exemplary embodiment of the present invention.

In FIG. 7, it illustrates a representation of a side view of the operation module (OpMod) 100 in accordance with an exemplary embodiment of the present invention. With regard to FIG. 8, it illustrates a representation of a top view of the operation module (OpMod) 100 in accordance with an exemplary embodiment of the present invention. With respect to FIG. 9, it illustrates a representation of a back view of the operation module (OpMod) 100 in accordance with an exemplary embodiment of the present invention.

Figure 10:
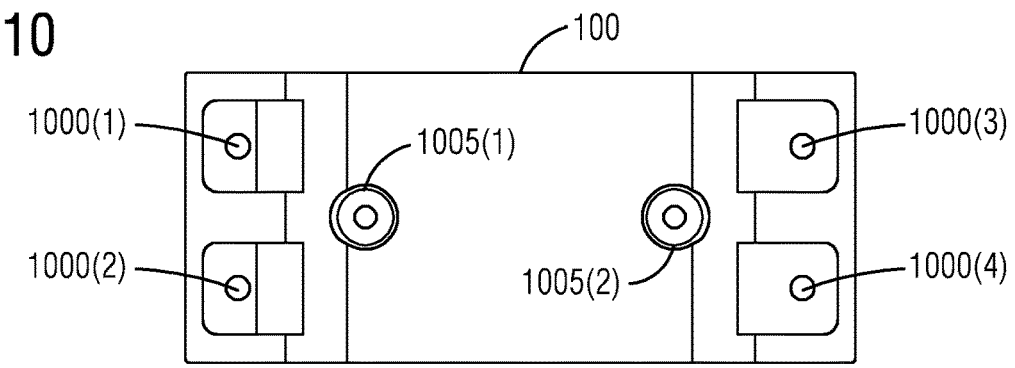
FIG. 10 illustrates a representation of a bottom view of an operation module (OpMod) in accordance with an exemplary embodiment of the present invention.

FIG. 10 illustrates a representation of a bottom view of the operation module (OpMod) 100 in accordance with an exemplary embodiment of the present invention. The operation module (OpMod) 100 includes a first pair of tapped holes 1000(1-2) in the first bus 600(1) and a second pair of tapped holes 1000(3-4) in the second bus 600(2). The first pair of tapped holes 1000(1-2) and the second pair of tapped holes 1000(3-4) match a bus in each application module (ApMod) 205. A symmetry of the first bus 600(1) and the second bus 600(2) allows the operation module (OpMod) 100 to follow any orientation relative to each application module (ApMod) 205. The operation module (OpMod) 100 includes a first hole 1005(1) to receive a first pin of the first application module (ApMod) 205 to align it with respect to the operation module (OpMod) 100. The operation module (OpMod) 100 includes a second hole 1005(2) to receive a second pin of the first application module (ApMod) 205 to align it with respect to the operation module (OpMod) 100.

Figure 11:
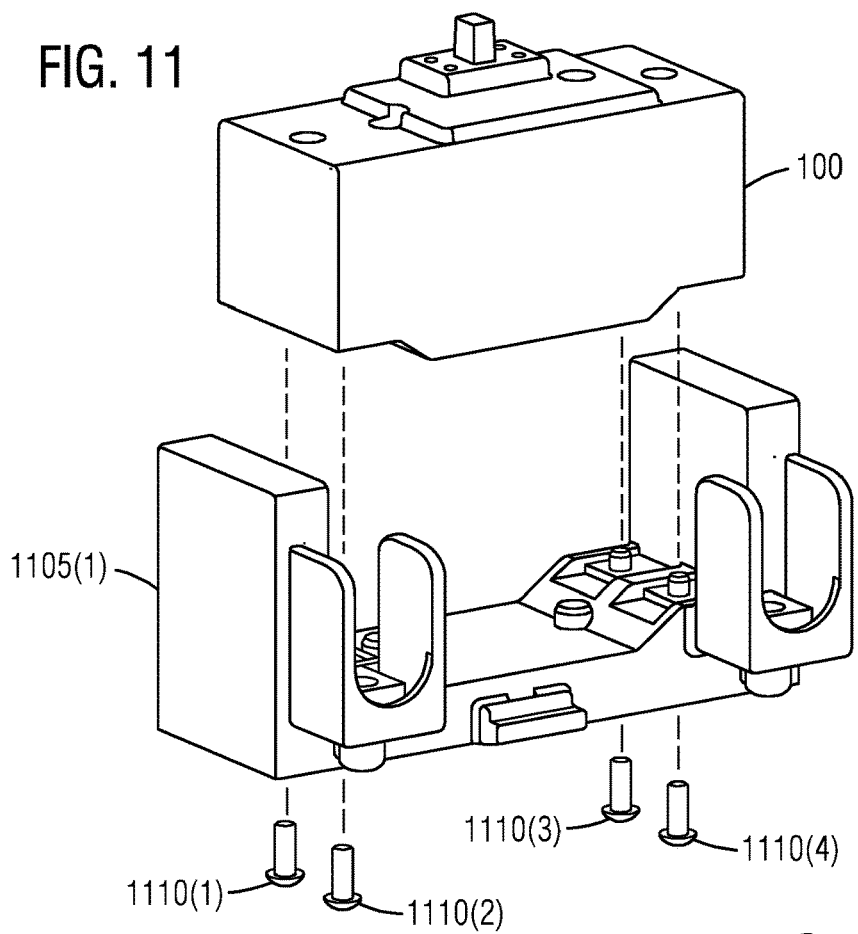
FIG. 11 illustrates a representation of an exploded isometric view of the operation module (OpMod) of FIG. 1 is being attached to a first application module (ApMod) in accordance with an exemplary embodiment of the present invention.
Figure 12:
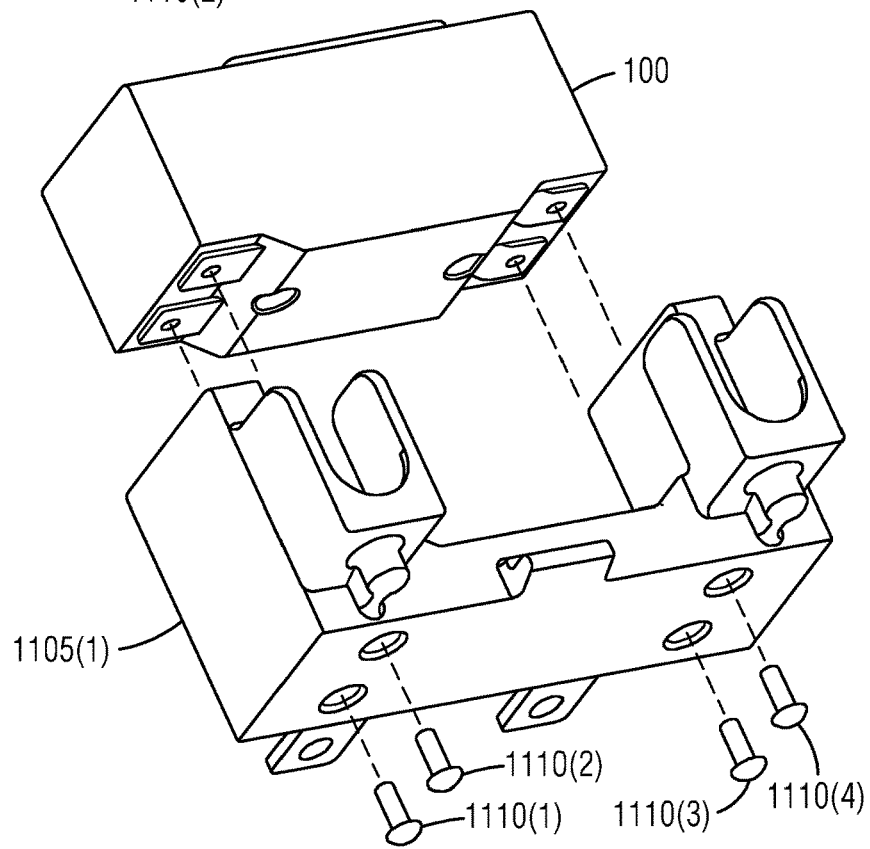
FIG. 12 illustrates a representation of an exploded orthographic view of the operation module (OpMod) of FIG. 1 is being attached to the first application module (ApMod) in accordance with an exemplary embodiment of the present invention.

FIG. 11 illustrates a representation of an exploded isometric view of the operation module (OpMod) 100 of FIG. 1 is being attached to a first application module (ApMod) 1105(1) in accordance with an exemplary embodiment of the present invention. The operation module (OpMod) 100 may be attached to the first application module (ApMod) 1105(1) using one or more fasteners such as fasteners 1110(1-4) to form an assembly of a circuit breaker. FIG. 12 illustrates a representation of an exploded orthographic view of the operation module (OpMod) 100 of FIG. 1 is being attached to the first application module (ApMod) 1105(1) in accordance with an exemplary embodiment of the present invention.

Figure 13:
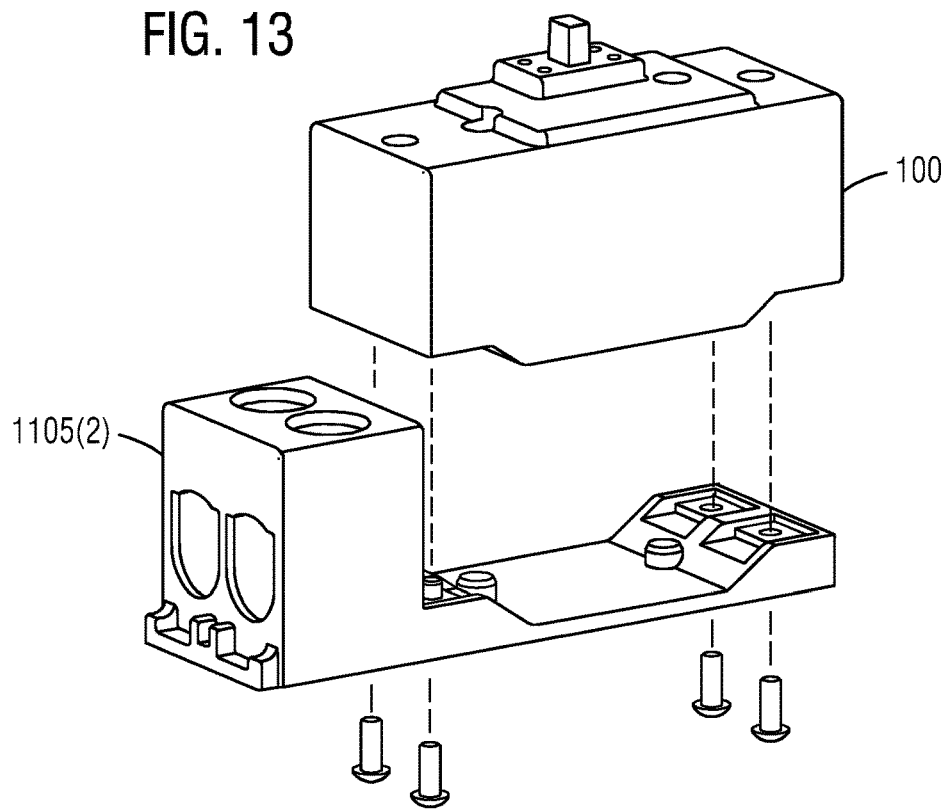
FIG. 13 illustrates a representation of an exploded isometric view of the operation module (OpMod) of FIG. 1 is being attached to a second application module (ApMod) in accordance with an exemplary embodiment of the present invention.
Figure 14:
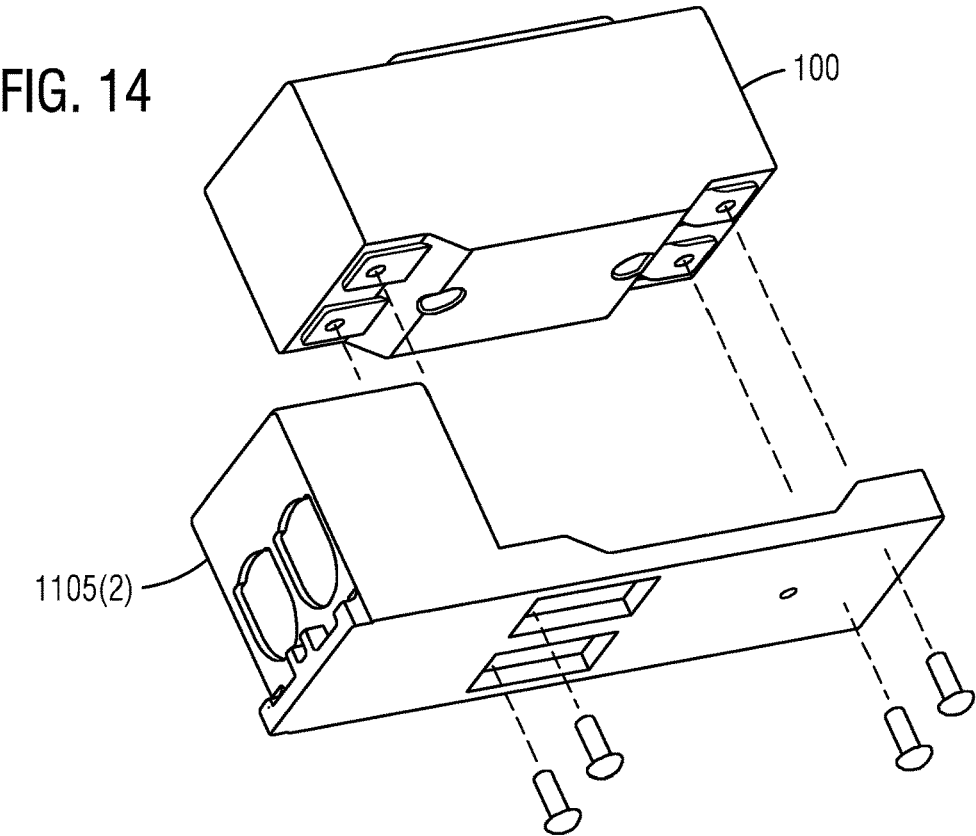
FIG. 14 illustrates a representation of an exploded orthographic view of the operation module (OpMod) of FIG. 1 is being attached to the second application module (ApMod) in accordance with an exemplary embodiment of the present invention.

FIG. 13 illustrates a representation of an exploded isometric view of the operation module (OpMod) 100 of FIG. 1 is being attached to a second application module (ApMod) 1105(2) in accordance with an exemplary embodiment of the present invention. FIG. 14 illustrates a representation of an exploded orthographic view of the operation module (OpMod) 100 of FIG. 1 is being attached to the second application module (ApMod) 1105(2) in accordance with an exemplary embodiment of the present invention.

Figure 15:
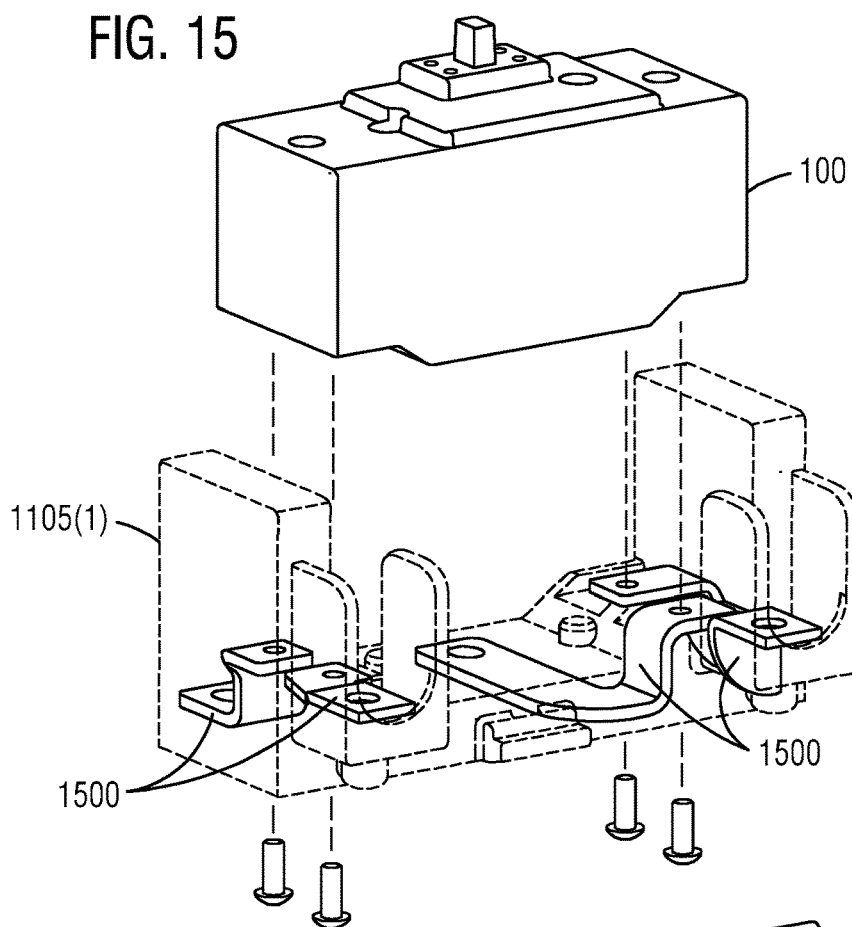
FIG. 15 illustrates a representation of an exploded isometric view of the operation module (OpMod) of FIG. 1 in that a bus (not seen) is being attached to a bus of the first application module (ApMod) in accordance with an exemplary embodiment of the present invention.
Figure 16:
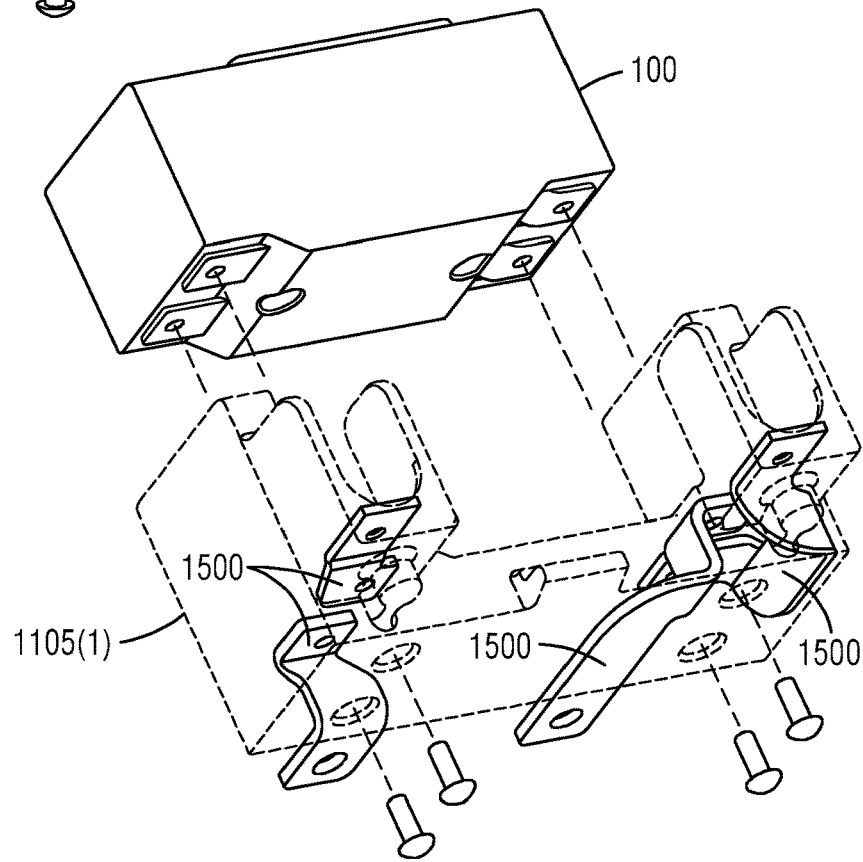
FIG. 16 illustrates a representation of an exploded orthographic view of the operation module (OpMod) of FIG. 1 in that the bus is being attached to the bus of the first application module (ApMod) in accordance with an exemplary embodiment of the present invention.

FIG. 15 illustrates a representation of an exploded isometric view of the operation module (OpMod) 100 of FIG. 1 in that a bus (not seen) is being attached to a bus 1500 of the first application module (ApMod) 1105(1) in accordance with an exemplary embodiment of the present invention. FIG. 16 illustrates a representation of an exploded orthographic view of the operation module (OpMod) 100 of FIG. 1 in that the bus is being attached to the bus 1500 of the first application module (ApMod) 1105(1) in accordance with an exemplary embodiment of the present invention.

Figure 17:
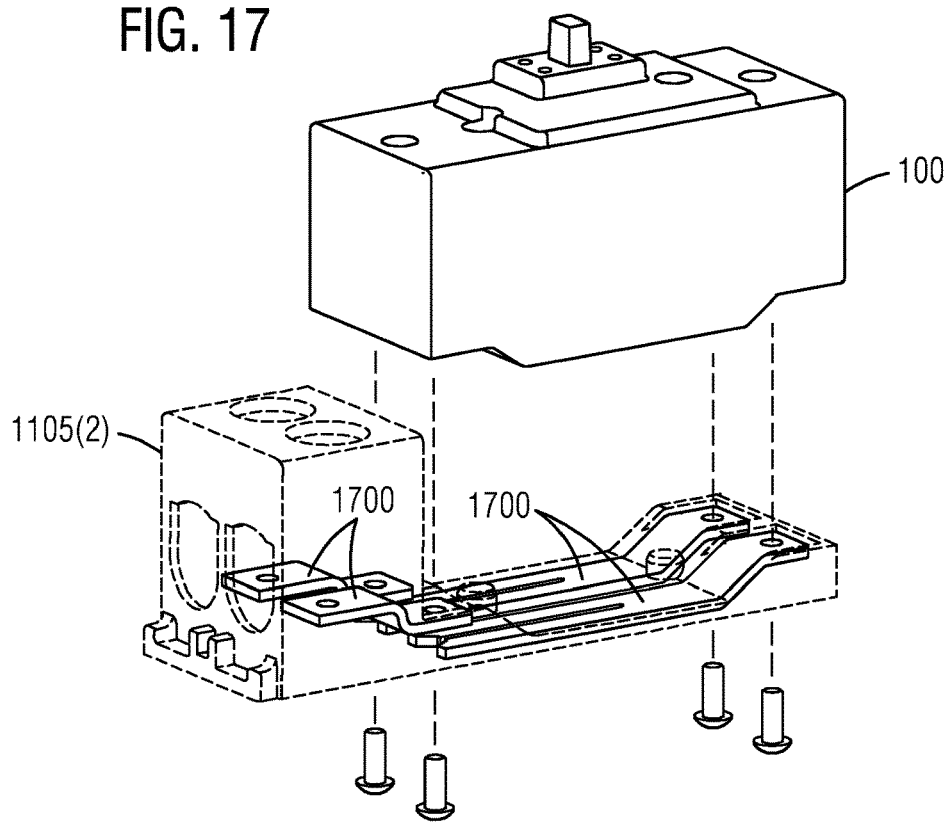
FIG. 17 illustrates a representation of an exploded isometric view of the operation module (OpMod) of FIG. 1 in that a bus (not seen) is being attached to a bus of the second application module (ApMod) in accordance with an exemplary embodiment of the present invention.
Figure 18:
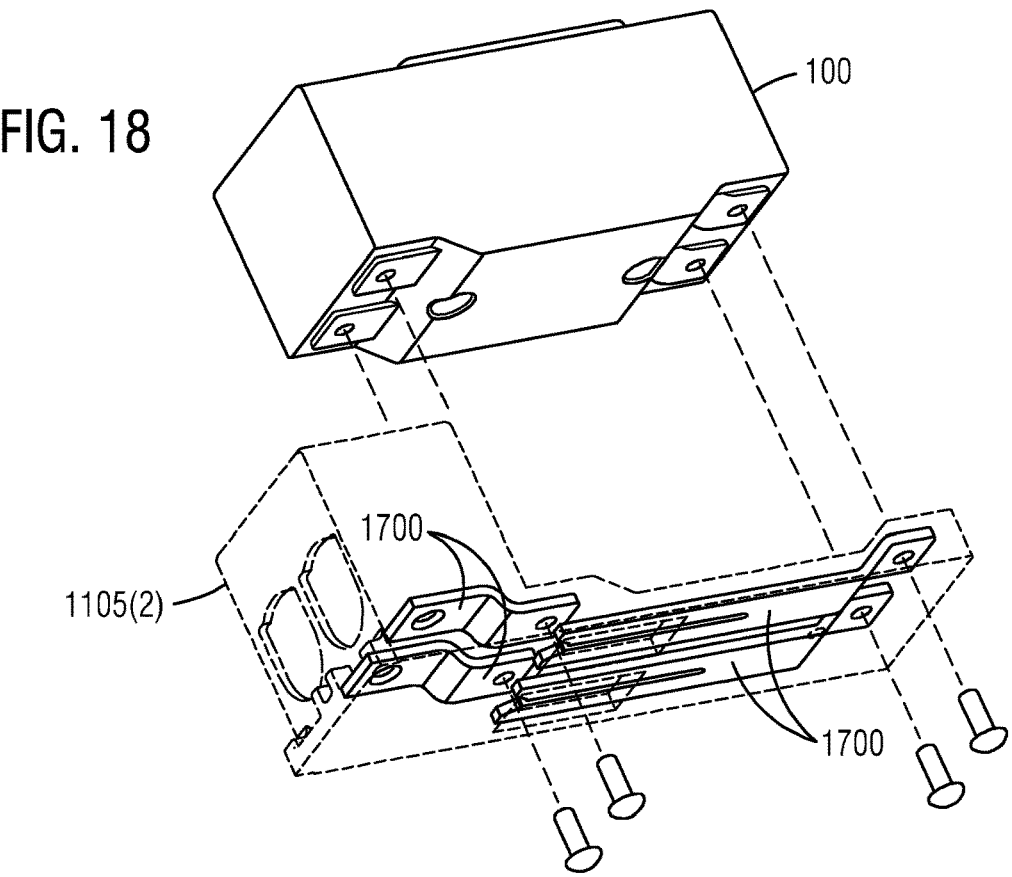
FIG. 18 illustrates a representation of an exploded orthographic view of the operation module (OpMod) of FIG. 1 in that the bus is being attached to the bus of the second application module (ApMod) in accordance with an exemplary embodiment of the present invention.

FIG. 17 illustrates a representation of an exploded isometric view of the operation module (OpMod) 100 of FIG. 1 in that a bus (not seen) is being attached to a bus 1700 of the second application module (ApMod) 1105(2) in accordance with an exemplary embodiment of the present invention. FIG. 18 illustrates a representation of an exploded orthographic view of the operation module (OpMod) 100 of FIG. 1 in that the bus is being attached to the bus 1700 of the second application module (ApMod) 1105(2) in accordance with an exemplary embodiment of the present invention.

Figure 19:
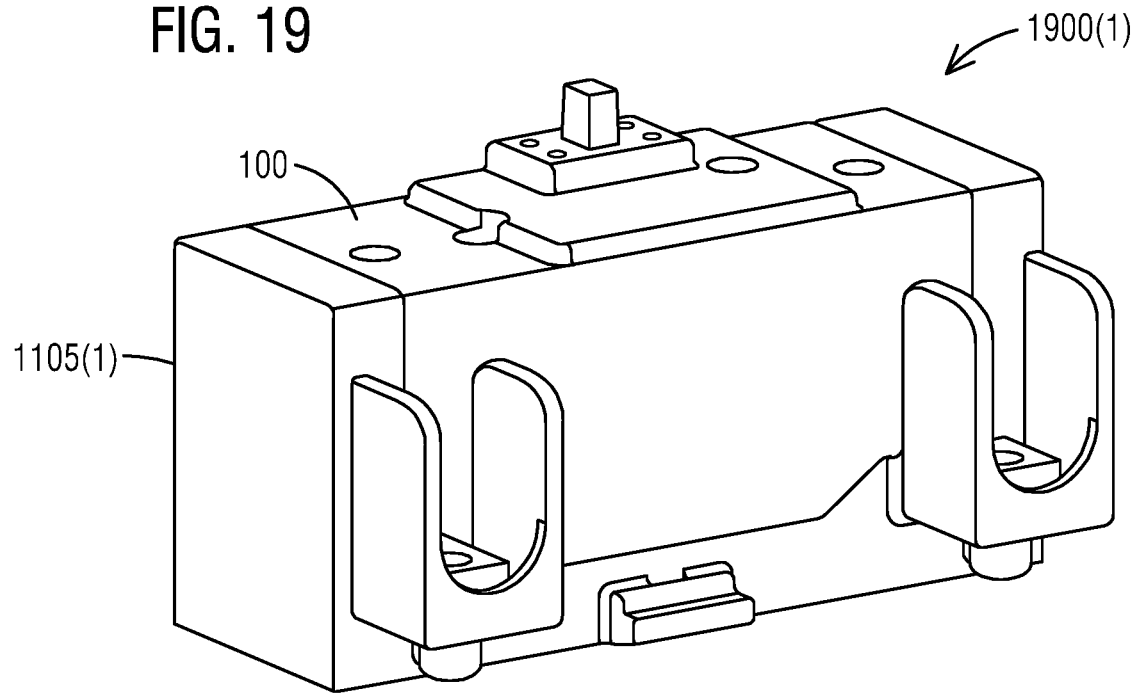
FIG. 19 illustrates a representation of a perspective view of the assembled modules to form a first modular circuit breaker based on a first application module in that the first application module includes a first mount type and a first current application in accordance with an exemplary embodiment of the present invention.
Figure 20:
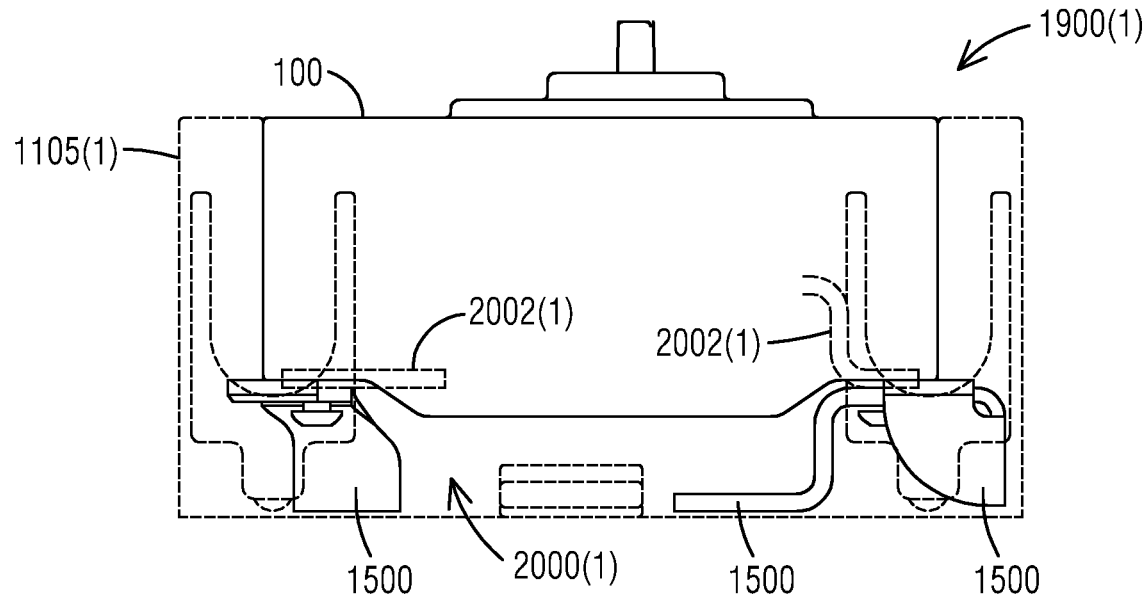
FIG. 20 illustrates a representation of a front view of the first modular circuit breaker with a first bus arrangement of a bus of the operation module and a bus of the first application module shown in accordance with an exemplary embodiment of the present invention.
Figure 21:
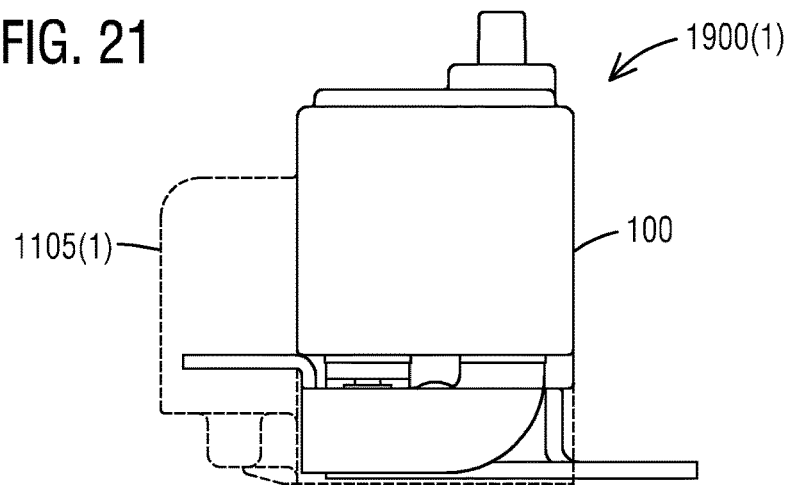
FIG. 21 illustrates a representation of a side view of the first modular circuit breaker with the first bus arrangement in accordance with an exemplary embodiment of the present invention.

FIG. 19 illustrates a representation of a perspective view of the assembled modules to form a first modular circuit breaker 1900(1) based on the first application module 1105(1) in that the first application module 1105(1) includes a first mount type 1908(1-2) (seen in FIG. 22) and a first current application 1910(1-2) (seen in FIG. 22) in accordance with an exemplary embodiment of the present invention. FIG. 20 illustrates a representation of a front view of the first modular circuit breaker 1900(1) with a first bus arrangement 2000(1) of a bus 2002(1) of the operation module (OpMod) 100 and the bus 1500 of the first application module 1105(1) shown in accordance with an exemplary embodiment of the present invention. FIG. 21 illustrates a representation of a side view of the first modular circuit breaker 1900(1) with the first bus arrangement 2000(1) in accordance with an exemplary embodiment of the present invention.

Figure 22:
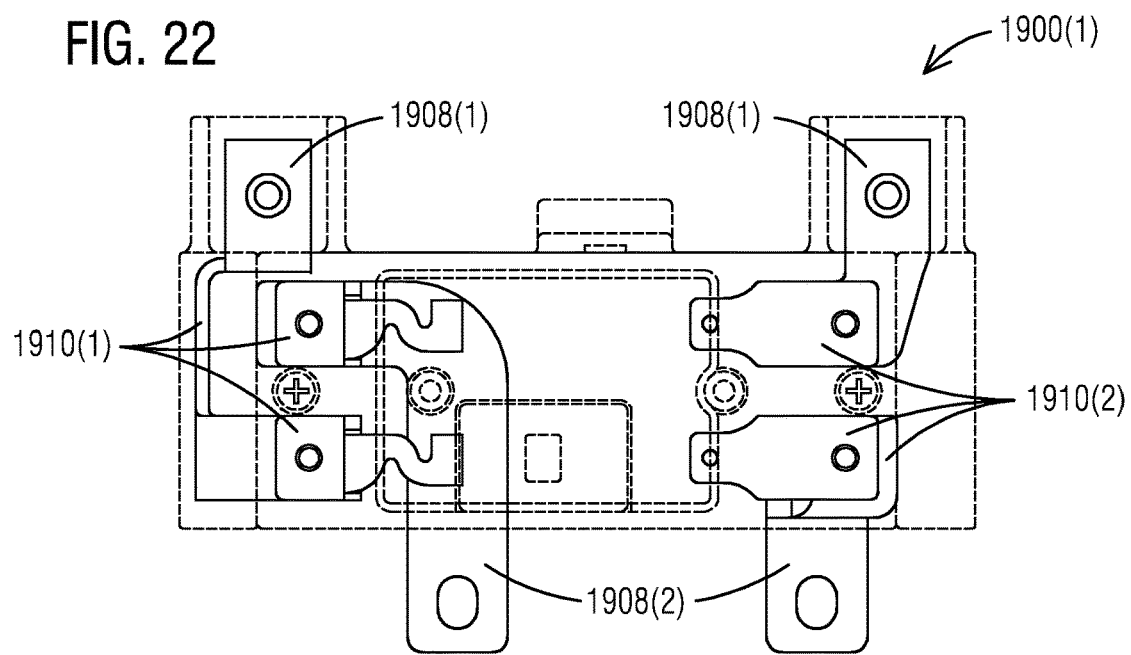
FIG. 22 illustrates a representation of a bottom view of the first modular circuit breaker with the first bus arrangement in accordance with an exemplary embodiment of the present invention.
Figure 23:
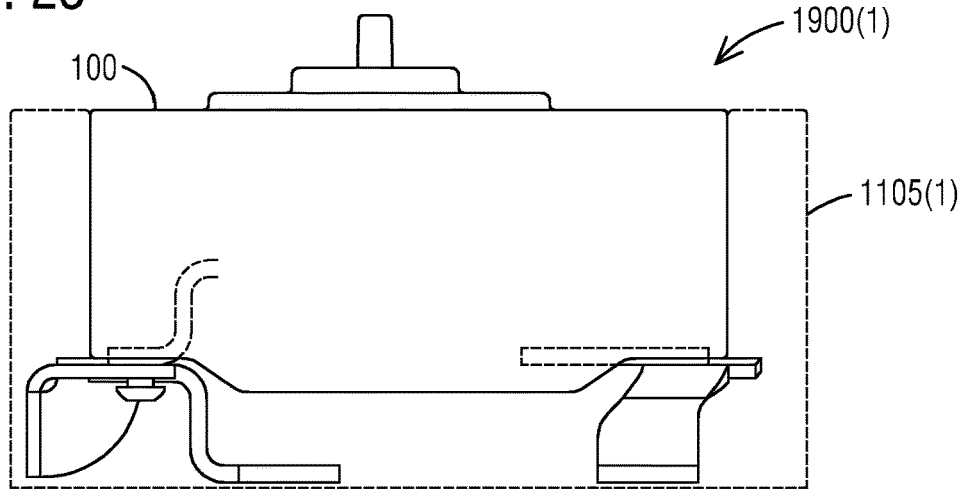
FIG. 23 illustrates a representation of a back view of the first modular circuit breaker with the first bus arrangement in accordance with an exemplary embodiment of the present invention.

FIG. 22 illustrates a representation of a bottom view of the first modular circuit breaker 1900(1) with the first bus arrangement 2000(1) in accordance with an exemplary embodiment of the present invention. The first application module 1105(1) includes the first mount type 1908(1-2) and the first current application 1910(1-2). FIG. 23 illustrates a representation of a back view of the first modular circuit breaker 1900(1) with the first bus arrangement 2000(1) in accordance with one embodiment of the present invention.

Figure 24:
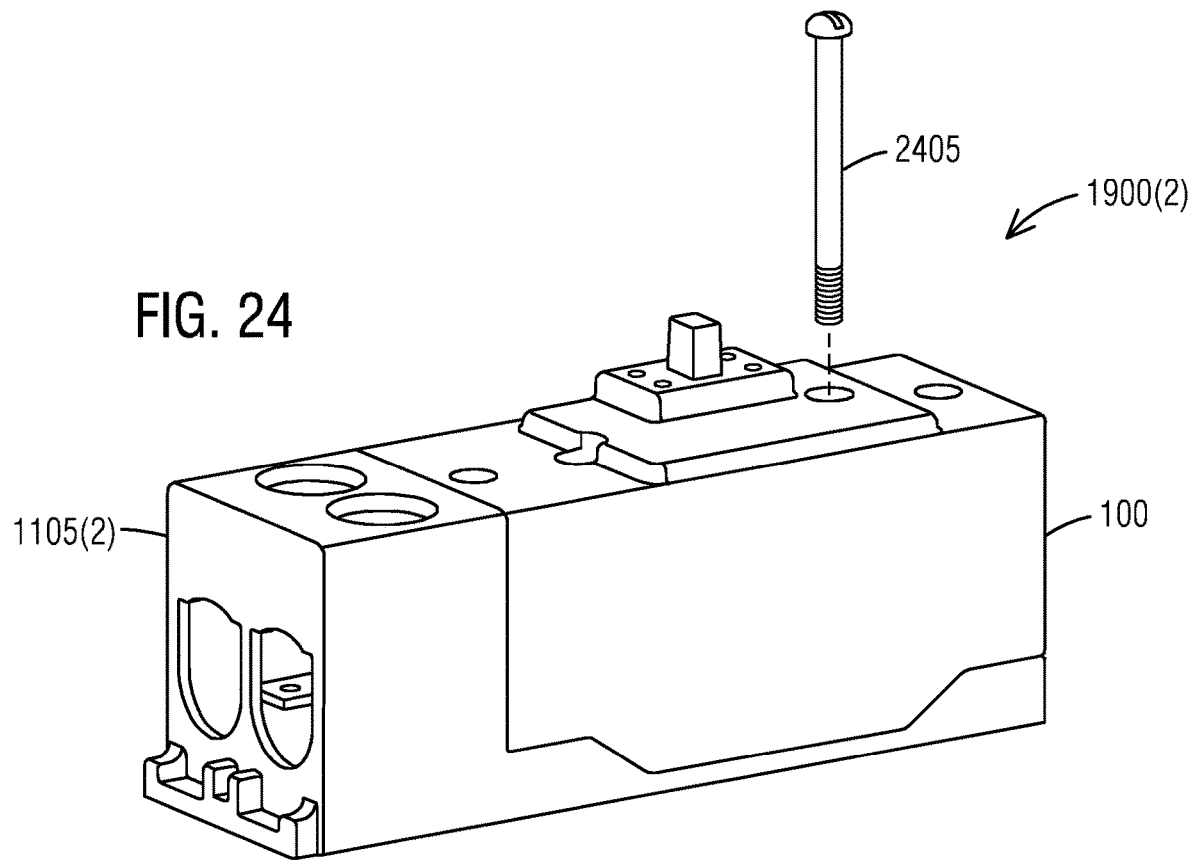
FIG. 24 illustrates a representation of a perspective view of the assembled modules to form a second modular circuit breaker based on a second application module in that the second application module includes a second mount type and a second current application in accordance with an exemplary embodiment of the present invention.
Figure 25:
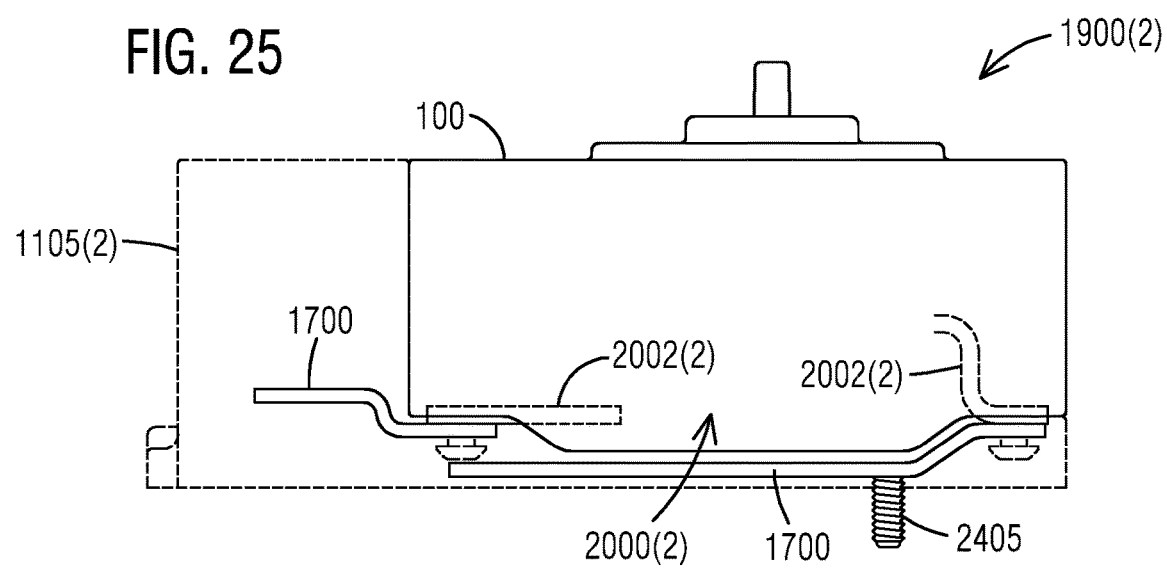
FIG. 25 illustrates a representation of a front view of the second modular circuit breaker with a second bus arrangement of a bus of the operation module and a bus of the second application module shown in accordance with an exemplary embodiment of the present invention.
Figure 26:
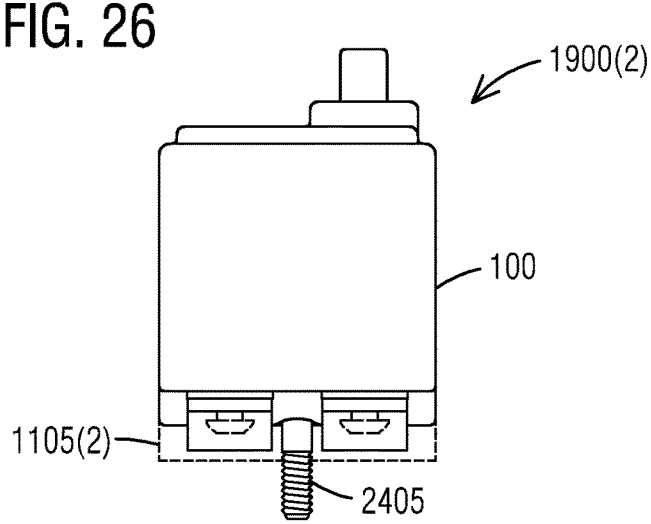
FIG. 26 illustrates a representation of a side view of the second modular circuit breaker with the second bus arrangement in accordance with an exemplary embodiment of the present invention.
Figure 27:
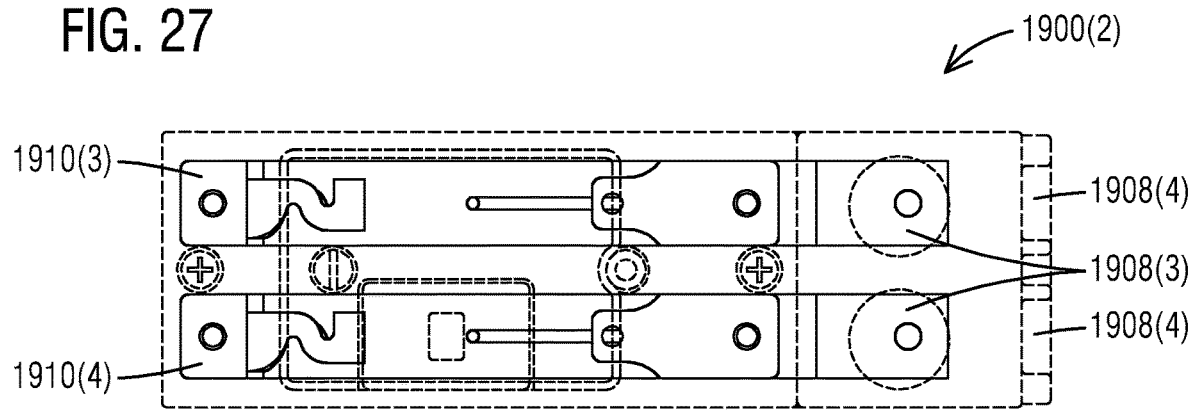
FIG. 27 illustrates a representation of a bottom view of the second modular circuit breaker with the second bus arrangement in accordance with an exemplary embodiment of the present invention.
Figure 28:
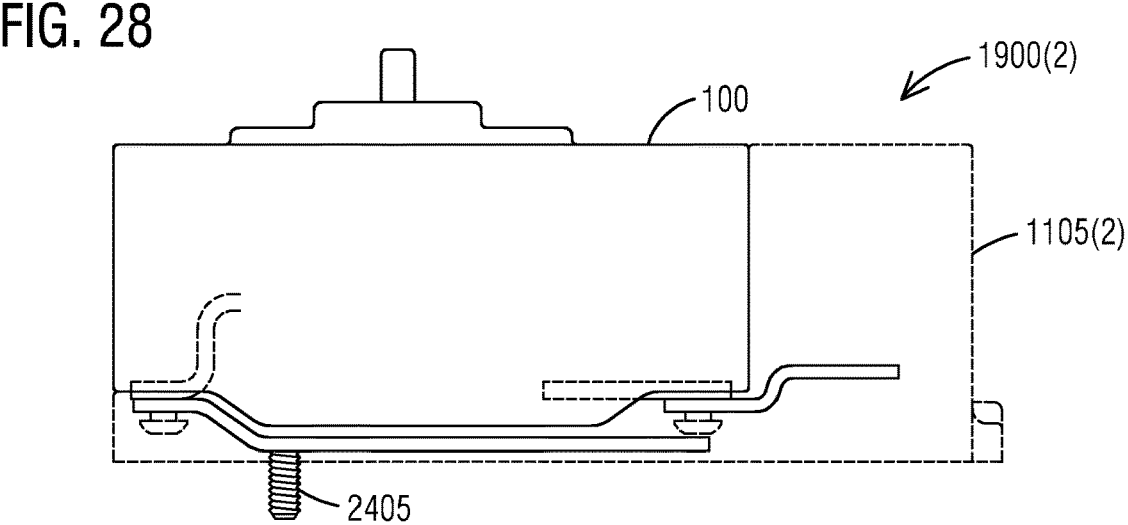
FIG. 28 illustrates a representation of a back view of the second modular circuit breaker with the second bus arrangement in accordance with an exemplary embodiment of the present invention.

FIG. 24 illustrates a representation of a perspective view of the assembled modules to form a second modular circuit breaker 1900(2) based on the second application module 1105(2) in that the second application module 1105(2) includes a second mount type 1908(3-4) (seen in FIG. 27 where 1908(4) mounting tabs attach to the load center and 1908(3) load current attaches to lugs) and a second current application 1910(3-4) (seen in FIG. 27) in accordance with an exemplary embodiment of the present invention. The second modular circuit breaker 1900(2) includes a breaker mounting screw 2405. FIG. 25 illustrates a representation of a front view of the second modular circuit breaker 1900(2) with a second bus arrangement 2000(2) of a bus 2002(2) of the operation module (OpMod) 100 and the bus 1700 of the second application module 1105(2) shown in accordance with an exemplary embodiment of the present invention. In the second application module 1105(2), in the bus 1700 a stab 2505 is mounted to a load center. FIG. 26 illustrates a representation of a side view of the second modular circuit breaker 1900(2) with the second bus arrangement 2000(2) in accordance with an exemplary embodiment of the present invention. FIG. 27 illustrates a representation of a bottom view of the second modular circuit breaker 1900(2) with the second bus arrangement 2000(2) in accordance with an exemplary embodiment of the present invention. FIG. 28 illustrates a representation of a back view of the second modular circuit breaker 1900(2) with the second bus arrangement 2000(2) in accordance with an exemplary embodiment of the present invention.

A first plug-in type application module 1105(1) configured to mate with the operation module 100 to form a complete circuit breaker and define a replacement breaker frame for having an external modularity for a modular residential circuit breaker 1900(1 or 2). The first plug-in type application module 1105(1) differs from other plug-in type application modules in that the first plug-in type application module 1105(1) includes the first mount type 1908(1-2) and the first current application 1910(1-2) defining a first way the modular residential circuit breaker 1900(1 or 2) is attached to a load current and a line current such that a mounting footprint and a bus arrangement matches a first existing singular breaker. The first plug-in type application module 1105(1) differs from a second plug-in type application module 1105(2) configured to be assembled to the operation module 100 in place of the first plug-in type application module 1105(1) in that each plug-in type application module 1105 of the first plug-in type application module 1105(1) and the second plug-in type application module 1105(2) provides a specific application.

The modular residential circuit breaker 1900(1 or 2) is a single phase circuit or a multi-phase circuit with a voltage rating of 120/240 VAC and a continuous current rating from 100-250 A. The modular residential circuit breaker 1900(1 or 2) may be a 2-pole main miniature circuit breaker.

The operation module 100 is a single operation module that is configured to be used with different plug-in type application modules 1105(1 or 2) for enabling different applications. All the different plug-in type application modules 1105(1 or 2) share the same single operation module such that an application can be added as needed. All the different plug-in type application modules 1105(1 or 2) differ in a current location and a mounting location.

A family of possible breaker frames is created by assembling the single operation module 100 and a plug-in type application module 1105 at a time with the different plug-in type application modules 1105(1 or 2) to form circuit breakers that represent an existing circuit breaker family. A modular circuit breaker technique is provided for production that enables creation of a new type of mounting for the modular residential circuit breaker 1900(1 or 2) by creating a new plug-in type application module 1105 without affecting how the modular residential circuit breaker 1900(1 or 2) works in the operation module 100. A modular circuit breaker technique is provided for production that enables making operational design changes to a circuit breaker family by changing just the operation module 100 instead of several individual breaker frames with the different plug-in type application modules 1105(1 or 2).

A number of circuit breakers can do basically the same job, but they may differ in the way they mount and the way they are attached to line and load current. Other than a current application and a mounting location, the circuit breakers may be very similar internally. Instead of having several stand-alone breaker frames, the operation module 100 encloses the usual functions of a circuit breaker, but without the specific mounting and the current application. Present invention creates a number of simple Application Modules 205 or 1105 that will attach to the operation module 100 to form a complete circuit breaker. Each type of application module 205 or 1105 will differ from the others and will provide a specific application. This modular approach will allow us to reduce the number of each type of breaker frame because they will all share the same operation module 100 and we can add an application as needed. In this way, the time involved in the product development cycle is reduced. The modular circuit breaker technique will shorten the time it takes an engineering group to develop new products.

Figure 29:
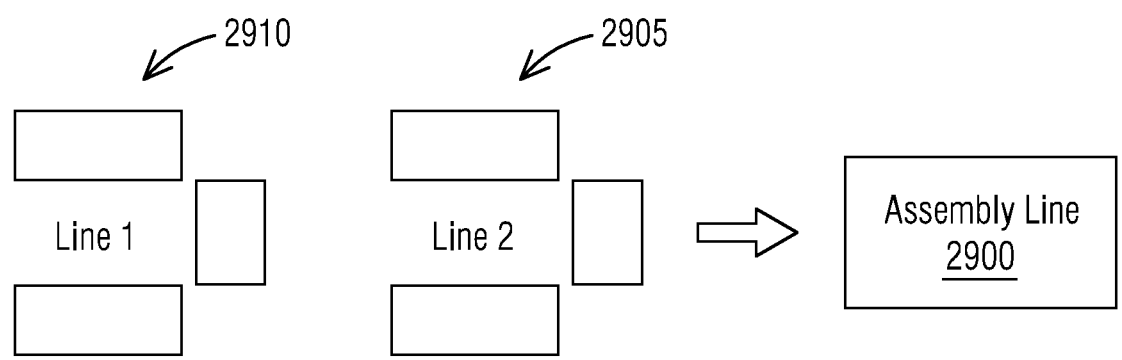
FIG. 29 illustrates a representation of an assembly line for production of a first modular circuit breaker in accordance with an exemplary embodiment of the present invention.

In FIG. 29, it illustrates a representation of an assembly line 2900 for production of the first modular circuit breaker 1900(1) in accordance with an exemplary embodiment of the present invention. A production line layout 2905 for the modular residential circuit breaker 1900 can reduce two production lines into one production line by simplifying a breaker assembly process and using a modular circuit breaker technique which will have a single operation module 100 that will be assembled with multiple different plug-in type application modules 1105(1 or 2).

An optimization of a current production line layout 2910 may be done by reducing two production lines to one. We can achieve this due to a modular circuit breaker concept, which will have a single operation module 100 that will be assembled with multiple different application modules 205 or 1105, simplifying the breaker assembly process. FIG. 29 depicts a very general overview of the production line layout 2905 with its intended goal. The potential elimination of a production line will be possible due to having a simplified product design with the single operation module 100 that can be used and assembled into many different external modules 1105(1 or 2).

One can stock operation modules 100 and application modules 205, 1105 and only assemble them as needed, based on current requirements. By maximizing manufacturing of operation modules 100 and simplifying application module 205, 1105 manufacturing, one could condense the number of assembly lines.

If a customer has a sudden need for a certain breaker type, one can simply increase the manufacture of that particular application module 205, 1105, add operation modules 100 and have them to the customer more quickly than building entire singular circuit breakers. In the event of a change to the basic operation of the main breaker, whether from customer requirements, regulatory agencies or internal reasons, one will make any design changes to the operation module 100, only, instead of making the change across the entire main breaker portfolio. One can react to customer requirements more quickly since one would only have to create a new application module 205, 1105.

With the ability to make a certain breaker simply by assembling an operation module 100 to an application module 205, 1105, one might spend less effort on forecasting. If a forecast turns out to be inaccurate, the above modularity concept could pick up the slack more quickly.

Floor space is gold in a manufacturing plant. Streamlining assembly lines may leave one more room for new products. One can cut lead time to the customer when he/she has an unexpected need. Its possible one can respond more quickly than any of the competitors. Being able to make operational design changes to a breaker family by changing just the operation module 100, instead of several individual breaker frames, one can reduce design time, engineering time, testing time and all the costs associate with them.

While a modular residential circuit breaker is described here a range of other constructions of circuit breaker are also contemplated by the present invention. For example, other types of non-residential circuit breakers may be implemented based on one or more features presented above without deviating from the spirit of the present invention.

The techniques described herein can be particularly useful for a main miniature circuit breaker. While particular embodiments are described in terms of the main miniature circuit breaker, the techniques described herein are not limited to the main miniature circuit breaker but can also be used for other circuit breakers.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A modular residential circuit breaker comprising:
   an operation module including an operation mechanism, a trip system, and an arc suppression system except a specific mounting and a current application; and
   a first plug-in type application module configured to mate with the operation module to form a complete circuit breaker and define a replacement breaker frame for having an external modularity for the modular residential circuit breaker,
   wherein the first plug-in type application module differs from other plug-in type application modules in that the first plug-in type application module includes a first mount type and a first current application defining a first way the modular residential circuit breaker is attached to a load current and a line current such that a mounting footprint and a bus arrangement matches a first existing singular breaker, and
   wherein the first plug-in type application module differs from a second plug-in type application module configured to be assembled to the operation module in place of the first plug-in type application module in that each plug-in type application module of the first plug-in type application module and the second plug-in type application module provides a specific application.

2. The modular residential circuit breaker of claim 1, wherein the modular residential circuit breaker is a single phase circuit or a multi-phase circuit with a voltage rating of 120/240 VAC and a continuous current rating from 100-250 A.

3. The modular residential circuit breaker of claim 1, wherein the modular residential circuit breaker is a 2-pole main miniature circuit breaker.

4. The modular residential circuit breaker of claim 1, wherein the operation module is a single operation module that is configured to be used with different plug-in type application modules for enabling different applications.

5. The modular residential circuit breaker of claim 4, wherein all the different plug-in type application modules share the same single operation module such that an application can be added as needed.

6. The modular residential circuit breaker of claim 5, wherein all the different plug-in type application modules differ in a current location and a mounting location.

7. The modular residential circuit breaker of claim 4, wherein a family of possible breaker frames is created by assembling the single operation module and a plug-in type application module at a time with the different plug-in type application modules to form circuit breakers that represent an existing circuit breaker family.

8. The modular residential circuit breaker of claim 1, wherein a production line layout for the modular residential circuit breaker can reduce two production lines into one production line by simplifying a breaker assembly process and using a modular circuit breaker technique which will have a single operation module that will be assembled with multiple different plug-in type application modules.

9. The modular residential circuit breaker of claim 1, wherein a modular circuit breaker technique for production enables creation of a new type of mounting for the modular residential circuit breaker by creating a new plug-in type application module without affecting how the modular residential circuit breaker works in the operation module.

10. The modular residential circuit breaker of claim 1, wherein a modular circuit breaker technique for production enables making operational design changes to a circuit breaker family by changing just the operation module instead of several individual breaker frames.

11. A modular residential circuit breaker comprising:
an operation module including an operation mechanism, a trip system, and an arc suppression system except a specific mounting and a current application; and
a first application module configured to mate with the operation module to form a complete circuit breaker and define a replacement breaker frame for having an external modularity for the modular residential circuit breaker,
wherein the first application module differs from other application modules in that the first application module includes a first mount type and a first current application defining a first way the modular residential circuit breaker is attached to a load current and a line current such that a mounting footprint and a bus arrangement matches a first existing singular breaker.

12. The modular residential circuit breaker of claim 11, wherein the modular residential circuit breaker is a single phase circuit or a multi-phase circuit with a voltage rating of 120/240 VAC and a continuous current rating from 100-250 A.

13. The modular residential circuit breaker of claim 11, wherein the modular residential circuit breaker is a 2-pole main miniature circuit breaker.

14. The modular residential circuit breaker of claim 11, wherein the operation module is a single operation module that is configured to be used with different application modules for enabling different applications.

15. The modular residential circuit breaker of claim 14, wherein all the different application modules share the same single operation module such that an application can be added as needed, wherein all the different application modules differ in a current location and a mounting location.

16. The modular residential circuit breaker of claim 11, wherein a production line layout for the modular residential circuit breaker can reduce two production lines into one production line by simplifying a breaker assembly process and using a modular circuit breaker technique which will have a single operation module that will be assembled with multiple different application modules.

17. The modular residential circuit breaker of claim 11, wherein a modular circuit breaker technique for production enables creation of a new type of mounting for the modular residential circuit breaker by creating a new application module without affecting how the modular residential circuit breaker works in the operation module.

18. The modular residential circuit breaker of claim 11, wherein a modular circuit breaker technique for production enables making operational design changes to a circuit breaker family by changing just the operation module instead of several individual breaker frames.

19. A modular residential circuit breaker comprising:
an operation module including an operation mechanism, a trip system, and an arc suppression system except a specific mounting and a current application; and
a first application module configured to mate with the operation module to form a complete circuit breaker and define a replacement breaker frame for having an external modularity for the modular residential circuit breaker,
wherein the first application module differs from a second application module configured to be assembled to the operation module in place of the first application module in that each application module of the first application module and the second application module provides a specific application.

* * * * *